Figure 1:
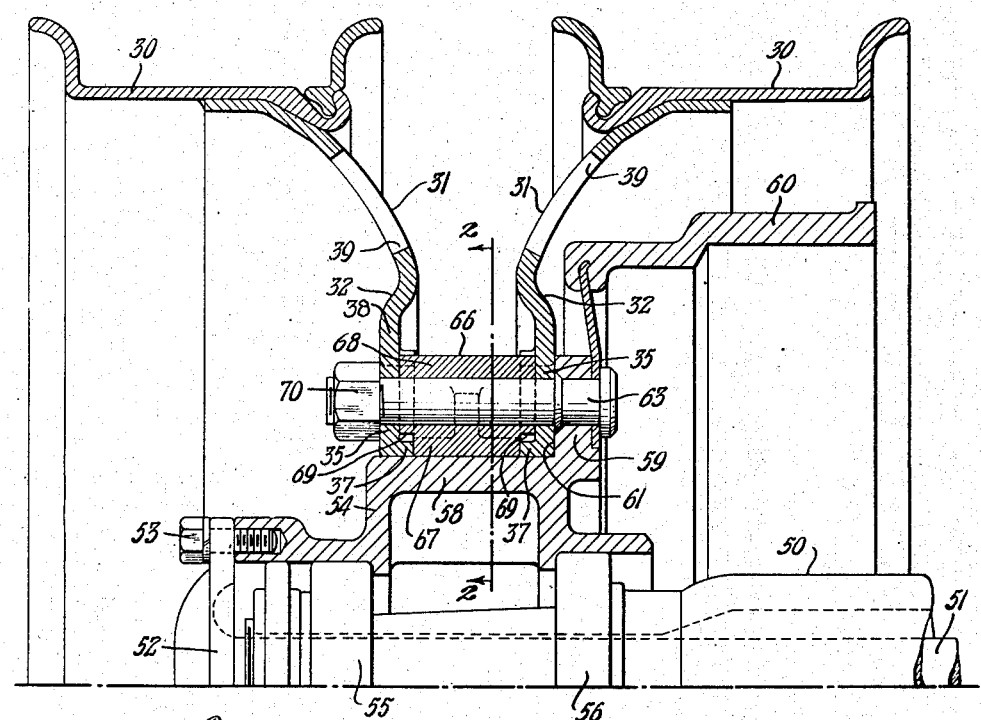

Oct. 2, 1945.  C. S. ASH  2,386,030

DUAL WHEELED VEHICLE

Original Filed Dec. 3, 1940

INVENTOR
Charles S. Ash
BY
ATTORNEY

Patented Oct. 2, 1945

2,386,030

UNITED STATES PATENT OFFICE 2,386,030

DUAL WHEELED VEHICLE

Charles S. Ash, Milford, Mich.

Original application December 3, 1940, Serial No. 368,301, now Patent No. 2,343,129, dated February 29, 1944. Divided and this application July 29, 1943, Serial No. 496,540

2 Claims. (Cl. 301—36)

The present invention relates to dual wheeled vehicles and more particularly to a novel and improved dual wheeled structure for an axle, particularly the rear axle of an automotive road vehicle having sets of dual wheels at the front and rear of the vehicle.

This application is a division of my copending application Serial No. 368,301, filed December 3, 1940, now matured into Patent No. 2,343,129, issued February 29, 1944.

Objects and advantages of the invention will be set forth in part hereinafter and in part will be obvious herefrom, or may be learned by practice with the invention, the same being realized and attained by means of the instrumentalities and combinations pointed out in the appended claims.

The accompanying drawing, referred to herein and constituting a part hereof, illustrates one embodiment of the invention, and together with the description, serve to explain the principles of the invention.

Figure 2:
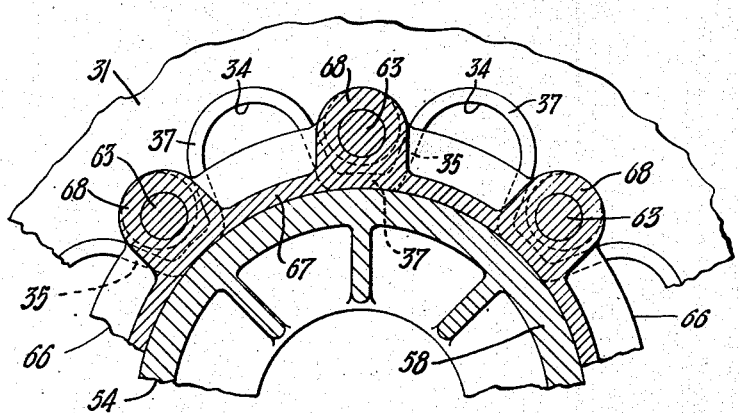

Of the drawing:

Fig. 1 is a fragmentary vertical sectional view showing a pair of driven dual wheels at one side of the rear of the vehicle by which the vehicle is adapted to be driven; and Fig. 2 is a fragmentary sectional view taken on the line 2—2 of Fig. 1.

The present invention has for an object the provision of a novel and improved dual wheeled structure for the rear axle of an automotive road vehicle of that type having sets of dual wheels, at the front as well as the rear thereof, certain of the wheels being mounted for dirigible movement, at least some of the wheels being driven, and certain of the wheels being adapted for independent rotation. A further object of the invention is the provision of a novel and improved dual wheeled vehicle in which the individual wheels of the sets of non-independently rotatable dual wheels, namely, wheels coupled to rotate together, are so mounted as to be interchangeable with duplicate or substantially identical wheels used in the dual wheel sets which are independently rotatable. The invention also provides a new and improved form of wheel and wheel mounting so that different types of wheels need not be employed for the independently rotatable and conventional dual wheels of the vehicle.

In order that the purposes and advantages of the present invention may be better explained, it it to be understood that the novel and improved dual wheeled rear axle structure is especially designed to be used on a vehicle in which the front of the vehicle is provided with two sets of dual wheels each of which comprises a pair of independently rotatable wheels coaxially mounted on closely adjacent hub members; and these dual wheels are also mounted for dirigible movement, the hub members serving to hold the wheels in proper spaced axial relation with respect to each other. Each of the wheels comprises a dished portion connecting the tire mounting rim with the hub, and the wheels are secured to the hub members so that they diverge radially outwardly to one edge of their respective rims. In the illustrated embodiment of the invention the rear axle of the vehicle is provided with two sets of driven dual wheels, one of which is shown the wheels of each set being held against rotation with respect to each other, and these wheels are substantially identical with the wheel members of the construction described used at the front of the vehicle. In said rear axle structure, a spacing member is provided between the adjacent wheels of each pair, and this spacing member holds the wheels in the same spaced axial relation as do the hub members at the front of the vehicle; the spacing member and the hub portion being adapted to receive the duplicate wheels so that all of the wheels of the entire vehicle are completely interchangeable, and different kinds of spare tires and wheels need not be carried on the vehicle.

It will be understood that the foregoing general description and the following detailed description as well, are exemplary and explanatory of the invention but are not restrictive thereof.

Referring now in detail to the drawing, a pair of pneumatically tired driving wheels, are illustratively shown as demountable wheels permanently attached to their rims; and these wheels are designed in practice to be duplicates of or substantially identical with the independently rotatable front wheels dirigibly mounted on the front axle for the steering of the vehicle. As embodied, each of the rims 30, of conventional construction, is permanently attached to a demountable wheel body 31 which is rather deeply dished and extends from a point closely adjacent to the center of the rim to one side edge thereof and thence radially inwardly, being slightly reversely dished, as at 32. At its inner edge, the wheel body 31 is formed with a plurality of short radially extending rounded slots 34 which provide short spokes or lug portions 35 between them. This inner edge of the wheel is preferably bent, as at 37, to provide a strengthening rib and a face by which the wheel may be seated on its hub, but aside from this edge 37, the central portion 38 of the wheel is preferably finished to provide parallel surfaces at the spokes 35. In order to lighten the wheel, to deaden its sound and to provide for the circulation of air, the wheel body 31 is formed with a plurality of apertures 39 uniformly spaced circumferentially of the wheel.

The drawing illustrates a novel mounting of dual wheels on a rear axle according to the present invention which is adapted to receive and hold wheels of the type described identical to the front wheels in the same spaced apart relation as on the front axle, but with the wheels held against relative rotation, as with conventional dual wheels. As illustrated, the rear axle comprises an axle tube 50 within which is the drive shaft 51 terminating in a driving flange 52 fast to the outer end of wheel hub 54 by means of the cap screws 53. The wheel hub 54 is mounted for rotation, as in a full floating axle, by means of the anti-friction bearings 55 and 56, which also serve to hold the wheel hub against axial movement with respect to the axle shaft 51 and tube 50.

Wheel hub 54 extends inwardly to provide a cylindrical portion 58, and near its inner end is provided with a radially extending flange 59 on which the brake drum 60 is mounted, while the outer side of the flange 59 is faced to provide a radial annular surface 61 against which the flat surface of the spokes 35 of the inner wheel may be seated, wheel securing bolts 63 also being provided to pass through the apertures of the spokes.

For spacing the driving wheels (which are not relatively rotatable) the same distance from each other as the independently rotatable dirigible front wheels are spaced, as before described, a spacing ring 66 is provided. This comprises a ring portion 67 provided with radially extending bosses 68 which are apertured to pass over the mounting bolts 63, and these bosses are cut away on both faces to be received within the recess provided by the curving rib 37 at the inner edge of the wheels. Thus, the cut-away shoulder portion 69 allows the face of rib 37 to seat against the spacing ring 66, 67, while the face of the bosses 68 is seated against the radially extending portion of the wheel spokes 35. The wheels are firmly held in proper spaced axial relation by means of the wheel mounting nuts 70 on the outer ends of bolts 63, while the cylindrical portion 58 of hub 54 supports the wheels in the proper coaxial relation.

It will thus be seen that the rear wheels diverge outwardly and are held in axially spaced relation which as stated is the same as the designed spacing in practice of the independently rotatable front wheels, and only a single type and size of tire rim and wheel is needed to replace any of the wheels of the vehicle. Thereby is avoided the necessity which has heretofore existed of carrying more than one type of a spare wheel and tire where certain of the dual wheels of a vehicle are independently rotatable and others are not independently rotatable.

The invention in its broader aspects is not limited to the specific mechanisms shown and described but departures may be made therefrom within the scope of the accompanying claims without departing from the principles of the invention and without sacrificing its chief advantages.

What I claim is:

1. In a dual wheel structure, the combination of a wheel hub having a plurality of wheel mounting bolts extending axially therefrom and surrounding an axially extending cylindrical portion of the hub, a pair of dished duplicate wheels having their dished portions adjacent to each other, each of said wheels having a centrally scalloped portion providing inwardly extending radial attaching lugs apertured to fit over the mounting bolts, the inner edge of the scalloped portion of each wheel being bent over to form narrow ribs at each side and the base of each lug and a radial surface offset toward the opposite side of the wheel from the scalloped edge and bounded at its sides and base by the ribs, the bent edges of the wheels being adjacent each other, and a spacer between said scalloped portions of the two wheels, said spacer being tubular and fitted to the tubular portion of the hub and having an outwardly projecting sleeve portion engaging each bolt between an opposed pair of lugs of the wheels, each sleeve portion being notched at its ends to bridge over the base ribs and fit between the side ribs and against the radial surfaces of the lugs.

2. In a dual wheel structure, the combination of a wheel hub having a plurality of wheel mounting bolts extending axially therefrom and surrounding an axially extending cylindrical portion of the hub, a pair of dished duplicate wheels having their dished portions adjacent to each other, each of said wheels having a centrally scalloped portion providing inwardly extending radial attaching lugs apertured to fit over the mounting bolts, said lugs being embossed to form recesses at their inner sides, and a spacer between the scalloped portions of the two wheels, said spacer being tubular and fitted to the cylindrical portion of the hub and having an outwardly extending radial sleeve portion engaging each bolt between an opposed pair of lugs of the wheels, each sleeve portion having its ends projecting beyond the spacer and engaging the recesses in the lugs.

CHARLES S. ASH.